Patented June 18, 1940

2,204,653

UNITED STATES PATENT OFFICE 2,204,653

ALIPHATIC DI - OXYMETHYLENE QUATERNARY AMMONIUM HALIDES AND PROCESS FOR PRODUCING THEM

Louis H. Bock, Philadelphia, Pa., assignor to Röhm & Haas Company, Philadelphia, Pa.

No Drawing. Application December 6, 1938, Serial No. 244,197

7 Claims. (Cl. 260—247)

This invention relates to a new class of quaternary ammonium compounds which contain two alkoxy methylene groups attached to the nitrogen atom, and to a process for producing these compounds.

Such quaternary ammonium derivatives, if they possess at least one long aliphatic chain, are capillary-active and are effective wetting, penetrating, dispersing and emulsifying agents of the cationic type. Since their active soap-like group bears a positive charge, these quaternary ammonium compounds are highly adsorbed by materials bearing a negative charge. They also offer the advantage that they are extremely reactive and can readily be caused to decompose or to react with the surface of many organic materials on which they are adsorbed. There are many potential uses for such compounds and there is a definite need for powerful wetting, penetrating, dispersing and emulsifying agents which may be easily decomposed in situ when so required.

Long chained quaternary ammonium salts with a single oxymethylene group have been proposed for some similar applications. While somewhat effective, they have the disadvantage that relatively high temperatures are needed to cause decomposition. When they are used as water-proofing agents for textiles, this high temperature frequently causes undue tendering of the threads.

It is an object of this invention to provide quaternary ammonium compounds which are thermally unstable or which are reactive with certain organic materials at mildly elevated temperatures. It is another object to provide quaternary ammonium compounds which are soluble in organic solvents and also in water. It is a further object to provide quaternary ammonium compounds which are both thermally unstable and capillary-active.

Compounds possessing the desired characteristics are obtained by reacting tertiary amines containing an alkoxymethyl group with chloromethyl ethers of aliphatic alcohols. The alkoxymethyl tertiary amines may be prepared by the method of Robinson and Robinson, Jour. Chem. Soc. 123,532 (1923). According to this method a primary alcohol, formaldehyde and a secondary amine are condensed in the presence of an alkaline catalyst.

For the purposes of this invention the secondary amine used for the preparation of the intermediate should contain lower members of the alkyl series, such as methyl, ethyl, or propyl or the groups should jointly form with the nitrogen atom a heterocyclic ring as found in piperidine or morpholine.

Thus, the intermediate alkoxymethyl tertiary amines possess the general formula

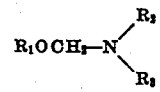

wherein $R_1$ represents a primary aliphatic hydrocarbon radical and $R_2$ and $R_3$ represent lower alkyl radicals or $R_2$ and $R_3$ represent jointly a divalent radical which forms with the nitrogen atom a heterocyclic ring. By the term "primary aliphatic hydrocarbon radical" is meant a radical such as is obtained from a primary alcohol and which, therefore, bears a methylene group, $CH_2$, in juxtaposition to the oxygen.

The chloro- or bromo-methyl ethers of the aliphatic alcohols are most readily prepared by the method shown in Example 1 of U. S. Patent No. 2,084,125. Aliphatic alcohols readily react with formaldehyde and a hydrogen halide in the cold to yield the corresponding halogenated methyl ether. The best yields are obtained with alcohols higher than ethyl alcohol, but the use of methyl and ethyl alcohols is not precluded. Usually the chief interest in such compounds is in ethers made from such alcohols as capryl, decyl, dodecyl, cetyl, octadecyl, dicapryl, 9, 10-octadecenyl, etc.

These ethers are of the general formula $$R-O-CH_2-X$$

wherein R represents an aliphatic hydrocarbon group and X represents a halogen.

By using an alcohol of high molecular weight in both the preparation of the tertiary amine and the chloromethyl ether it is possible to introduce two long chains into the quaternary ammonium salt, but a long chained alcohol is not essential for the preparation of the alkoxy tertiary amine, and often is not desired. Best yields of this intermediate are obtained when the primary alcohol contains not more than 12 carbon atoms.

In reacting the alkoxymethyl tertiary amine and the halogenated methyl ether, the mixture is maintained at a temperature under 60° C. It is not generally necessary to heat the mixture to start the reaction. If desired, the halomethyl ether may be gradually run into the alkoxymethyl amine or the reactants may be mixed in bulk. Anhydrous solvent assists in giving a more easily stirred reaction mixture. During the reaction period reasonable care should be taken to exclude moisture. When the reaction is sufficiently complete, the solvent is removed by distillation at reduced pressure if the compound itself is desired, or the resulting quaternary ammonium salt may be kept in the organic solvent and so used for some applications.

The following examples are illustrative of the process, but the invention is not to be limited thereby, except within the scope of the claims, as various modifications will be obvious to those skilled in the art.

*Example 1*

32 parts of amyloxymethyl dimethylamine, 25 parts of dry benzene, and 67 parts of octadecyl chloromethyl ether were mixed in a flask equipped with a calcium chloride tube and with a mechanical stirrer. The mixture was stirred for 5½ hours on a water bath at 50° C. The benzene was removed by evaporating under reduced pressure at 50° C. The product remaining was a thick, syrupy liquid which set to a stiff paste on standing. It formed a soapy solution in water and dissolved to give a clear solution in toluene.

*Example 2*

In a flask equipped with a protective calcium chloride tube and with a mercury-sealed mechanical stirrer were placed 94 parts of octyloxymethyl dimethylamine, 150 parts of dry toluene, and 173 parts of hexadecyl chloromethyl ether. The mixture was stirred several hours at room temperature. The toluene was removed by evaporation under reduced pressure at 50° C. The product was a stiff paste, soluble in hydrocarbon solvents and also in water.

*Example 3*

In a flask equipped with a protective calcium chloride tube and with a mercury-sealed mechanical stirrer were placed 100 parts of dodecyloxymethyl dimethylamine, 100 parts of dry toluene, and 104 parts of hexadecyl chloromethyl ether. The mixture was stirred for 8 hours at room temperature. The toluene was removed by evaporation under reduced pressure at 50° C. The product was a stiff paste soluble in hydrocarbon solvents, and also in water.

In like manner other quaternary ammonium compounds containing two oxymethylene groups attached to the nitrogen atom may be prepared. Typical compounds in which $R_2$ and $R_3$ form a ring are methoxymethyl octyloxymethyl piperidinium chloride, butyloxymethyl dodecyloxymethyl pyrrolidinium chloride, propyloxymethyl hexadecyloxymethyl morpholinium chloride, cetyloxymethyl butyloxymethyl morpholinium chloride, octadecyloxymethyl propyloxymethyl piperidinium chloride, dodecyloxymethyl amyloxymethyl morpholinium bromide, etc. Typical compounds in which $R_2$ and $R_3$ are lower alkyl radicals are dibutyloxymethyl diethyl ammonium chloride, amyloxymethyl heptyloxymethyl dimethyl ammonium chloride, methoxymethyl amyloxymethyl dimethyl ammonium chloride, dodecyloxymethyl ethyloxymethyl dimethyl ammonium bromide, di(dodecyloxymethyl)-diethyl ammonium bromide, cetyloxymethyl butyloxymethyl dibutyl ammonium chloride, etc.

The quaternary ammonium compounds of the present invention are less stable than those derived from trialkyl amines or aryl dialkyl amines and chloromethyl ethers. They decompose gradually after being dissolved in water, and they decompose more readily when heated. However, they are sufficiently stable to form emulsions which can be kept for several hours up to several days. They are particularly valuable where it is desired to use an emulsifying agent which will later be destroyed. Such a use is found in applying waterproofing or finishing compositions to textile materials. The new compounds are in themselves valuable as water-proofing agents, since they readily decompose on fabric when heat is applied and in the case of cotton, linen, straw, rayon, etc., react to form a chemical modification of cellulose which is water-repellent. Wool and silk may also be thus rendered water-repellent. The new compounds are valuable as softening agents for textiles, when used alone or when used in conjunction with finishing oils. By the application of heat, the compounds are decomposed and rendered insoluble or reacted with the fabric, so that the finish is not readily removed by washing or dry-cleaning. They also react with starch or cellulosic sizes or finishes to render these coatings relatively insoluble and "fixed" and at the same time impart a desirable hand. When only fixing of these finishes is desired, the substituent groups need not be large, the presence of a group containing about eight carbon atoms being sufficient. When a moderate degree of softness is desired as well as fixation of the finish, a group having twelve carbon atoms will serve. Longer groups give greater softness and, of course, an increased degree of water-resistance and water-repellency. These compounds are useful for after-treating textiles to improve the fastness or dyeings. They may also be used in conjunction with reducing agents for stripping dyes.

The compounds which are herein disclosed are of the general formula

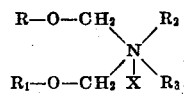

wherein $R_1$ and $R$ represent aliphatic hydrocarbon groups, $R_2$ and $R_3$ are members of the group consisting of lower alkyl groups and divalent groups jointly forming a heterocyclic ring with the nitrogen atom and X represents a halogen. When surface-active compounds are desired, at least one of the groups $R$ and $R_1$ must contain at least eight carbon atoms.

I claim:

1. Compounds of the general formula

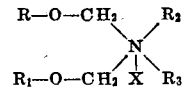

wherein $R$ represents an aliphatic hydrocarbon group, $R_1$ represents a primary alkyl group, $R_2$ and $R_3$ represent members of the group consisting of lower alkyl radicals, divalent saturated hydrocarbon radicals jointly with the nitrogen forming a heterocyclic ring, and divalent ether radicals jointly with the nitrogen forming a heterocyclic ring, and X represents a halogen.

2. A compound of the general formula

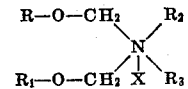

wherein $R$ represents an aliphatic hydrocarbon group and $R_1$ a primary alkyl group, at least one of which groups contains from 8 to 18 carbon atoms, $R_2$ and $R_3$ represent members of the group consisting of lower alkyl radicals, divalent saturated hydrocarbon radicals jointly with the nitrogen forming a heterocyclic ring, and divalent ether radicals jointly with the nitrogen forming a heterocyclic ring, and X represents a halogen.

3. A compound of the general formula

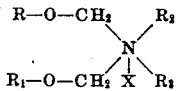

wherein R represents an aliphatic hydrocarbon radical and $R_1$ represents a primary alkyl radical, $R_2$ and $R_3$ represent lower alkyl radicals and X represents a halogen.

4. Octadecyloxymethyl amyloxymethyl dimethyl ammonium chloride.

5. Cetyloxymethyl dodecyloxymethyl dimethyl ammonium chloride.

6. Cetyloxymethyl butyloxymethyl morpholinium chloride.

7. A process for making relatively unstable quaternary ammonium compounds which comprises reacting below 60° C. an amine of the general formula

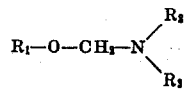

wherein $R_1$ represents a primary alkyl radical, $R_2$ and $R_3$ represent members of the group consisting of lower alkyl radicals, divalent saturated hydrocarbon radicals jointly with the nitrogen forming a heterocyclic ring, and divalent ether radicals jointly with the nitrogen forming a heterocyclic ring, and a halogenated ether of the formula R—O—CH$_2$—X wherein R represents an aliphatic hydrocarbon group and X represents a halogen.

LOUIS H. BOCK.